Aug. 23, 1955  W. F. BROWN  2,715,868
COFFEE EXTRACTING AND DISPENSING APPARATUS
Filed Nov. 23, 1951  2 Sheets-Sheet 1
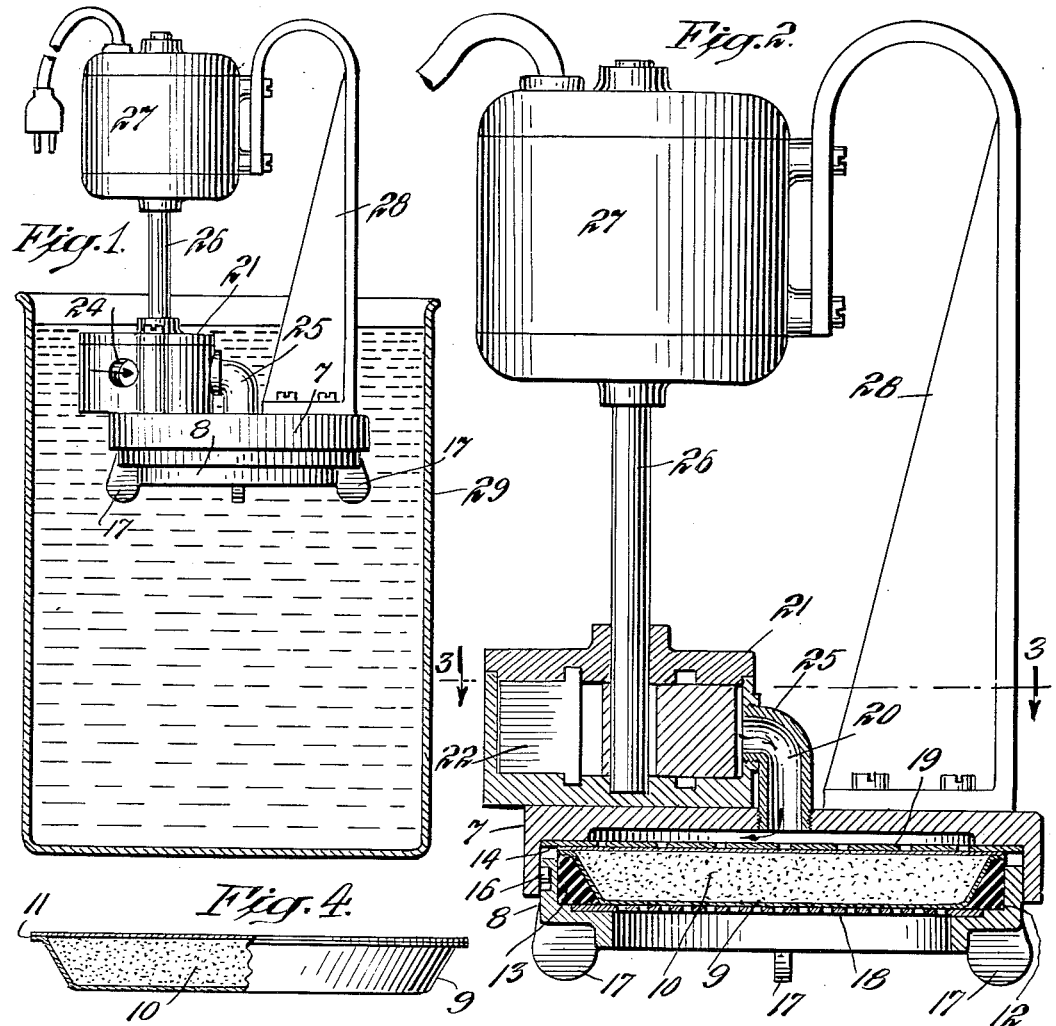
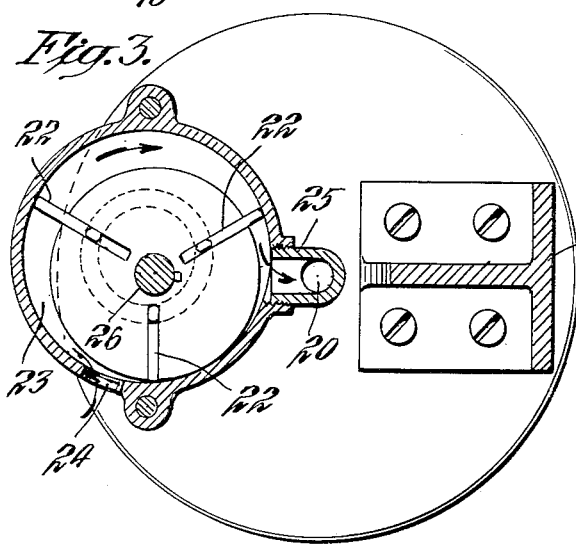
INVENTOR.
WILLIAM F. BROWN
BY
Philip S. McLean
ATTORNEY Aug. 23, 1955 W. F. BROWN 2,715,868
COFFEE EXTRACTING AND DISPENSING APPARATUS
Filed Nov. 23, 1951 2 Sheets-Sheet 2
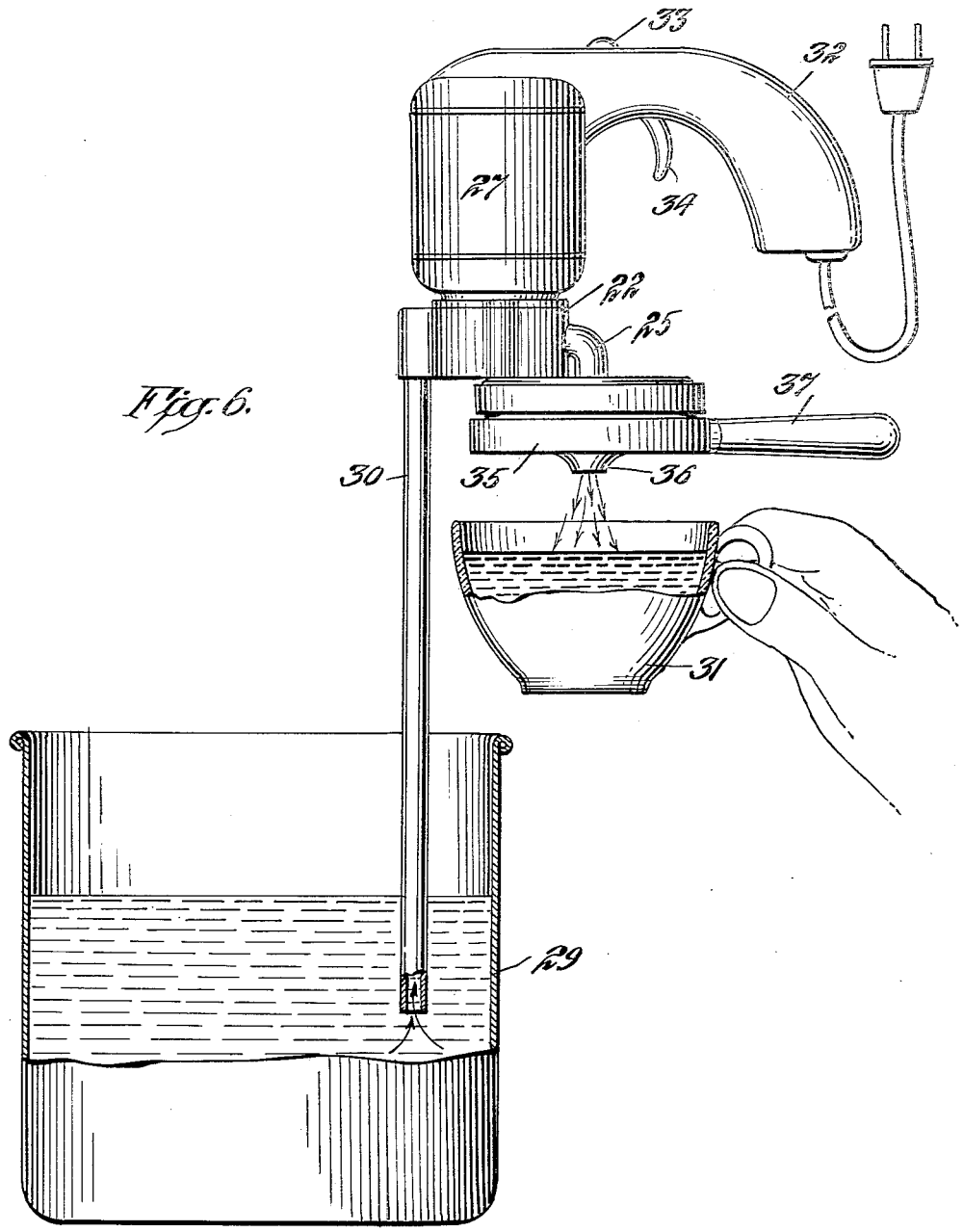
INVENTOR.
WILLIAM F. BROWN
BY
ATTORNEY

United States Patent Office 2,715,868
Patented Aug. 23, 1955

2,715,868

COFFEE EXTRACTING AND DISPENSING APPARATUS

William F. Brown, Pawling, N. Y., assignor to International Coffee Corporation, New York, N. Y., a corporation of New York Application November 23, 1951, Serial No. 257,840

1 Claim. (Cl. 99—302)

The invention herein disclosed relates to the preparation of coffee, tea and other beverages, and objects of the invention generally are to provide a small, hand portable type of coffee maker, not combined or associated with a tank or holder for hot water but which may be used when an extraction is to be made, with any holder or source of hot water that may be convenient or available.

Specifically the invention comprises an extractor head designed to hold a cartridge of beverage forming material and means, in the nature of a pump, adapted to be temporarily submerged in or connected with a holder of hot water and to operate to force the hot water through the extractor head.

In one form of the invention the pump and extractor head are designed to be both submerged in the hot water and to operate in this submerged relation to recirculate the beverage forming liquid through the pump and through the cartridged material contained in the extractor head.

In another form of the invention the pump and extractor head are supported clear of the liquid, with the pump drawing liquid from the hot water containing vessel through a tube and discharging the beverage liquid into a cup or other container, or possibly back into the same hot water vessel.

Special objects of the invention are to provide a device of the character indicated which will be small enough to be easily handled and supported in association with the separate hot water containing vessel and which will be of simple, durable construction, suitable for use in the kitchen and the like.

Other desirable objects attained by the invention and the novel features of construction, combinations and relations of parts constituting the invention are hereinafter set forth or will appear in the course of the following specification.

The drawings accompanying and forming part of the specification illustrate present preferred embodiments of the invention. Structure, however, may be further modified and changed, all within the true intent and scope of the invention as hereinafter defined and claimed.

Fig. 1 in the drawings is a side elevation of one of the submersible type extractors as in use in connection with an ordinary open top, hot water containing vessel;

Fig. 2 is a broken and part vertical sectional view of the extractor on an enlarged scale;

Fig. 3 is a horizontal cross sectional view of the same on substantially the plane of line 3—3 of Fig. 2;

Fig. 4 is a broken part sectional view of one of the extract material containing cartridges used in the machine;

Fig. 5 is a plan view of the lower, removable section of the extractor head;

Fig. 6 is a partly sectional side elevation illustrating one of the lift type extractors in use with a water containing vessel.

The extractor, as shown particularly in Figs. 1 and 2, comprises a head structure 7 and a companion, removably connected holder 8, the two cooperatively providing a chamber for containing and supporting the beverage forming cartridge 9.

The latter is shown in Fig. 4 as made up of layers of porous material such as filter paper, containing the ground coffee 10 or other material for extraction, and having their edges sealed together in a continuous annular flange 11 designed to be clamped between the companion, relatively separable members 7 and 8.

The parts are sealed in the engaged relation described by a compressible ring 12 of rubber, plastic or other suitable resilient material seated in the cup-like cavity 13 in the lower member and extending upwardly sufficiently to engage and clamp the flange 11 against the top portion 14 of the chamber cavity in the upper, head structure.

The parts are removably connected in the illustration through the medium of bayonet grooves 15 in the lower member, engageable with correspondingly located pins 16 on the inner wall of the upper member.

The lower, removable member is shown in Figs. 1 and 2 as having downwardly projecting handle lugs 17 by which it may be turned into and out of interlocked relation in the upper member.

The lower member is shown as having a perforated plate 18 for supporting the cartridge, and the upper member is shown as having a similar perforated plate 19 for distributing the hot water entering the top of the head through the conduit 20.

The pump for forcing the hot water through the extractor head is indicated at 21 and is shown in Fig. 3 as of the rotary type having blades 22 operating in the pump chamber 23 to transfer liquid entering the pump chamber at 24, out through outlet 25 into conduit 20 in the extractor head.

This pump is shown as directly mounted upon or forming a part of the extractor head and as driven by shaft 26 from electric motor 27.

The motor is shown in Figs. 1 and 2 as connected by a bracket or post 28 with the extractor head so as to form, in effect, an integral part of the same.

Fig. 1 shows how the device may be used by simply submerging the pump and extractor into the hot water in an open top container 29. The latter may simply be a kettle, pot or pan being heated on a stove, this assuring that water at boiling temperature will be forced under pressure through the porous cartridge contained in the submerged head. This circulation may be continued for as short or for as long a period as desired, depending on the strength and character of extraction required.

The handle lugs 17 dependent from the holder 8 may serve as feet for supporting the device in upright relation on a table or the like and, if desired, these dependent elements may be extended to serve as stops for engagement with the bottom of a vessel to prevent the device being lowered to a point the motor would enter the water.

In the modification illustrated in Fig. 6, the pump is equipped with a downwardly extended inlet tube 30 which may be dipped into the hot water, without submerging the pump or extractor head.

In such case the beverage liquid may be delivered from the extractor into a cup or other such container 31 or, if recirculation is desired, back into the hot water heating vessel 29.

In this form of the invention the motor 27 is shown as having a pistol grip type handle 32, equipped with a control switch such as the thumb switch 33 or trigger switch 34. If equipped with both, the two switches may be interlocked for safety reasons so that simultaneous operation of both will be required to effect action of the pump.

In this particular form of the invention the motor, pump and extractor may all be closely and compactly combined in a small unit which may be easily handled.

While the pump is shown as of the rotary bladed type, it is contemplated that any practical form of pumping means may be employed. Similarly, while an electric motor may be preferred for operating the pump, it is considered that any motive power may be utilized for this purpose.

In the submerged form of extractor first illustrated the extracted beverage liquid may pass directly through the perforate bottom plate of the separable holder 8 into the liquid in the containing vessel.

In the second form illustrated the removable holder portion 35 of the extractor may be made with a discharge spout 36 in the bottom of it for confining and directing the liquid, and for convenience the holder may be equipped with a projecting operating handle 37.

The inlet 24 to the pump may be screw threaded as indicated, or otherwise formed so that the pump may be used either with or without the extended inlet tube. Thus the same extractor head and pump combination may be used for either form of the invention illustrated.

What is claimed is:

Coffee extracting and dispensing apparatus comprising an extractor head having relatively separable parts forming a chamber for containing a cartridge of beverage extraction material, said extractor head having an inlet for hot water and an outlet for the extracted beverage, a pump mounted on said extractor head having an inlet for hot water and having an outlet connected with the inlet of the extractor head and means connected with said pump for operating the same to force hot water as described through the extractor head, said operating means for the pump comprising an electric motor directly mounted on the extractor head and forming therewith a single portable unit, the pump inlet including a tube dependent from the pump adapted to be dipped into a vessel containing hot water and the outlet from the extractor head including a delivery spout adjoining said tube but disposed above the lower end of the tube and whereby the extracted beverage may be delivered into a cup held beneath said spout or the extracted beverage be delivered back into the hot water containing vessel for recirculation through the extractor head.

References Cited in the file of this patent

UNITED STATES PATENTS

| | | |
|---|---|---|
| 1,226,005 | Rathman | May 15, 1917 |
| 2,355,094 | Moore | Aug. 8, 1944 |
| 2,451,195 | Brown | Oct. 12, 1948 |
| 2,529,395 | Hummel | Nov. 7, 1950 |
| 2,561,631 | Negri | July 24, 1951 |

FOREIGN PATENTS

| | | |
|---|---|---|
| 293,551 | Great Britain | July 12, 1928 |
| 314,618 | Italy | Feb. 1, 1934 |
| 450,986 | Italy | Aug. 19, 1949 |
| 674,259 | Germany | Apr. 11, 1939 |